United States Patent [19]
Wharton

[11] 3,768,336
[45] Oct. 30, 1973

[54] DIFFERENTIAL

[75] Inventor: Richard F. Wharton, Chicago, Ill.

[73] Assignee: Illinois Tool Works Inc., Chicago, Ill.

[22] Filed: June 29, 1971

[21] Appl. No.: 157,953

[52] U.S. Cl. ............................................. 74/714
[51] Int. Cl. ............................................. F16h 1/42
[58] Field of Search .................. 74/714, 710, 713

[56] References Cited
UNITED STATES PATENTS

| | | | |
|---|---|---|---|
| 691,591 | 1/1902 | Brown | 74/714 |
| 732,327 | 6/1903 | Warner | 74/714 |
| 827,095 | 7/1906 | Gray | 74/714 |
| 900,857 | 10/1908 | Jeffery | 74/714 |
| 1,030,379 | 6/1912 | Benson | 74/714 X |
| 1,987,674 | 1/1935 | Ford | 74/714 |
| 2,788,679 | 4/1957 | Mott | 74/714 |
| 3,365,984 | 1/1968 | Musgrave | 74/713 |

Primary Examiner—Charles J. Myhre
Assistant Examiner—Thomas C. Perry
Attorney—Robert W. Beart et al.

[57] ABSTRACT

A differential has a housing with two coaxial sun gears and two pairs of planetary pinions carried by the housing. The planetary pinions of each pair mesh with each other as well as with their respective sun gears so that two pinions, namely one in each pair, are capable of rotation in an orbit about its associated sun gear. The planetary pinion pairs transmit driving torque to the sun gears upon rotation of the housing yet permit differential rotation of the sun gears. Furthermore, the sun gears integrally include hollow tubular hubs that project outwardly from opposite sides of the housing so that the shaft or axles to be driven can be quickly connected to the hubs without the necessity of disassembly of the differential unit. Spur gears are used throughout, which simplifies and reduces the cost of the differential unit.

1 Claim, 6 Drawing Figures

PATENTED OCT 30 1973

Inventor
Richard H. Wharton
By: Olson, Trexler, Wolters & Bushnell attys

PATENTED OCT 30 1973
3,768,336
SHEET 2 OF 2
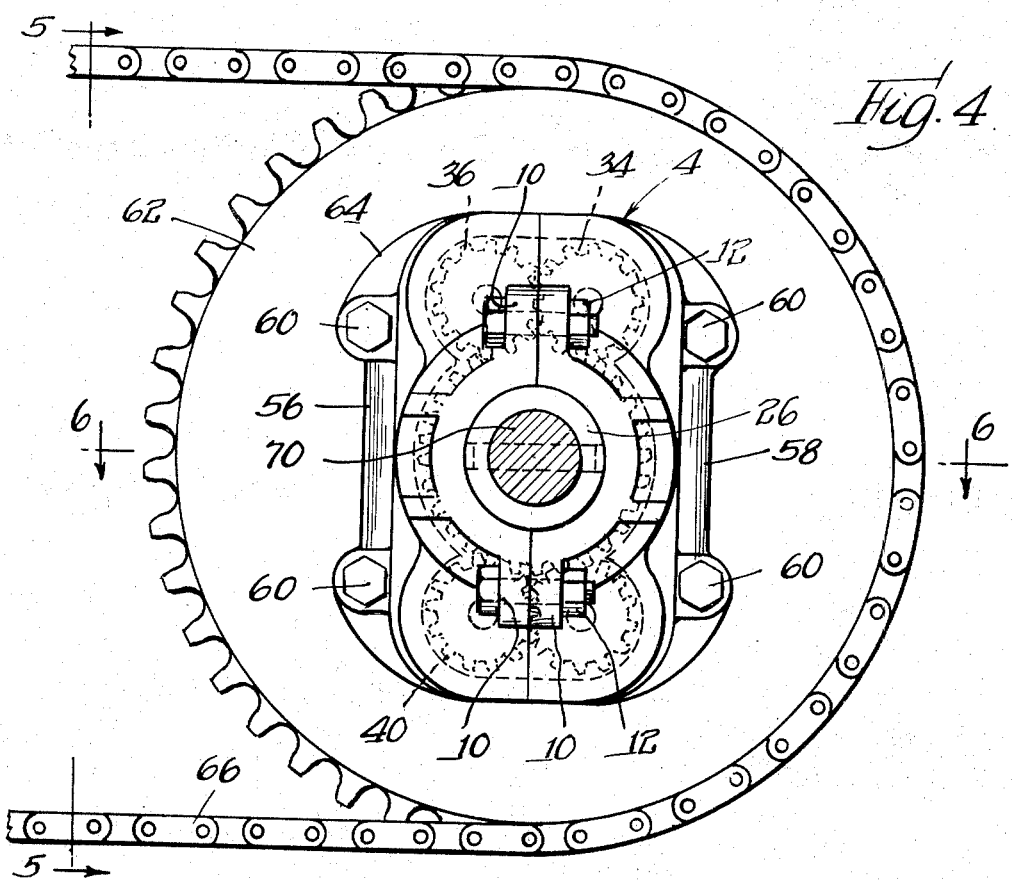
Fig. 4
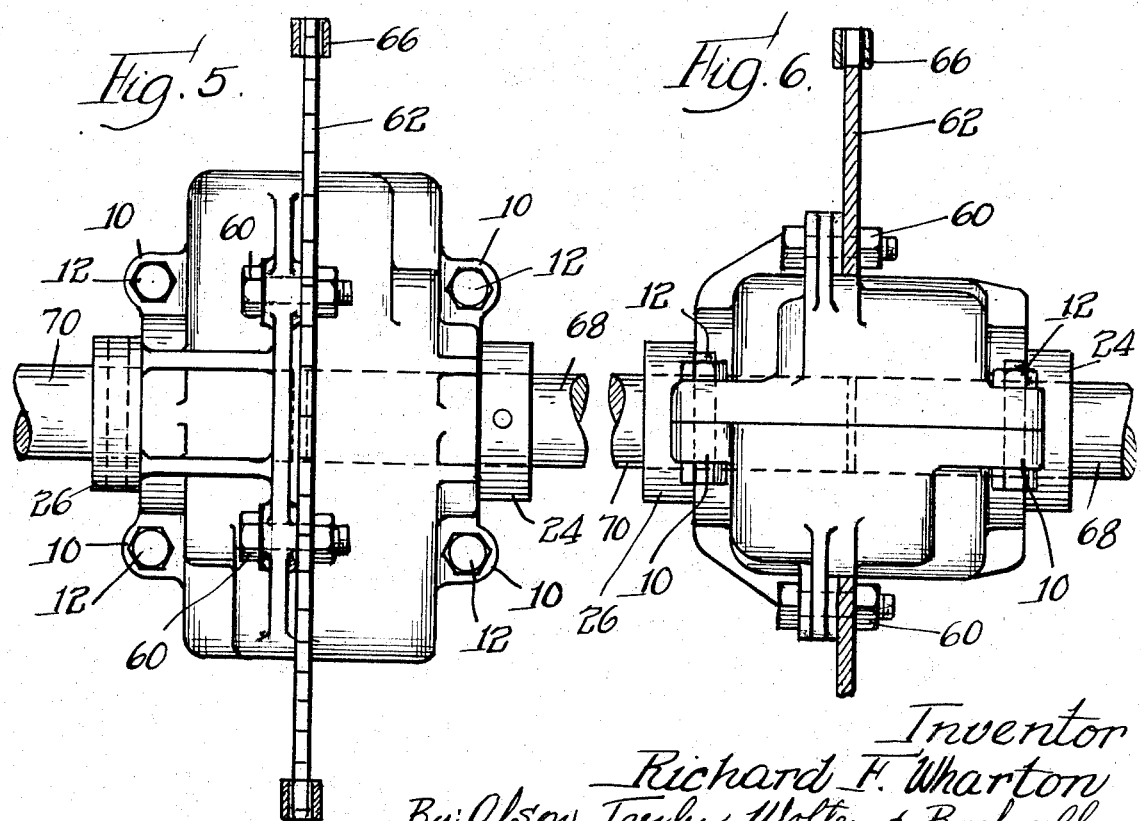
Fig. 5.
Fig. 6.
Inventor
Richard F. Wharton
By: Olson, Trexler, Wolters & Bushnell
attys

3,768,336

DIFFERENTIAL

BACKGROUND OF THE INVENTION

This invention relates to a differential of a type that is particularly suitable for garden tractors and similar small vehicles.

In the manufacture of small garden tractors and like vehicles, it is common for the manufacturer to purchase differential units for incorporation into his vehicle. In such situations, the design of the differential has been such that the differential unit must be originally manufactured with integral axles because the sun gears must be coupled by keying or otherwise to the axles that are to be driven by the unit. This has seriously limited the vehicle manufacturer in being able to work on the axles separately of the differential unit. Obviously, such a situation is costly and prevents the vehicle manufacturer from economically substituting other axles.

OBJECTS AND SUMMARY OF THE INVENTION

An object of the present invention is to provide a differential which is so constructed and arranged that the axles or shafts to be driven may be coupled to the differential unit without the necessity of even partial disassembly thereof, thereby simplifying the incorporation of the unit into a tractor or the like.

A further object of the present invention is to provide a differential of the type stated in which a driving gear or sprocket may be readily attached to the differential housing so that the latter may be rotated for applying, through the gearing within the housing, driving torque to the axles to be driven by the differential unit.

Another object of the present invention is to provide a differential of the type stated which is relatively inexpensive to manufacture both in terms of the cost of component parts and in terms of ease of assembly. Spur gears are used throughout in contrast to the customary bevelled gears usually found in differentials.

In accordance with the foregoing objects, the invention contemplates a differential unit having coaxial sun gears which may be differentially rotated through planetary gearing carried by the differential housing, whereby the rotating housing transmits, through the planetary gearing, driving torque to the sun gears. The sun gears are characterized as integrally including tubular hubs that project outwardly from opposite sides of the differential housing. As a result, the axles or other shafts to be driven by the differential may be easily inserted into the bores of the hubs. Consequently, the user (e.g., the tractor manufacturer) may use his own axles for the particular size of tractor in which the differential unit is to be incorporated. The hubs are preferably pre-drilled for receiving roll pins to lock the axles therein, it being necessary simply to drill each axle with a diametral hole for receiving the oll pin. Splining of the hub bore or of the driven axle or shaft is not necessary. Of course, the axle end must be of a proper size to fit into the hub bore.

The housing need not, and preferably is not, equipped with a drive sprocket, thereby enabling the user to use a drive sprocket or like driving member of his own choosing. For this purpose, however, the housing has peripheral flanges with bolt holes whereby a sprocket with a generally rectangular central opening may be readily bolted to the housing roughly at the mid-plane thereof. A feature of the invention is that the two halves of the housing are joined in a plane perpendicular to the plane of the driving sprocket, so that the central opening of the sprocket can serve to substantially hold the housing halves together and thereby reduce the number of fasteners needed to lock the housing halves together.

BRIEF DESCRIPTION OF THE FIGURES

In the drawing:

FIG. 4 is a sectional view taken along line 4—4 of FIG. 1;

FIG. 5 is a sectional view taken along line 5—5 of FIG. 4; and

FIG. 6 is a fragmentary sectional view taken along line 6—6 of FIG. 4, but showing the housing and parts therein in elevation.

DETAILED DESCRIPTION

Figure 1:
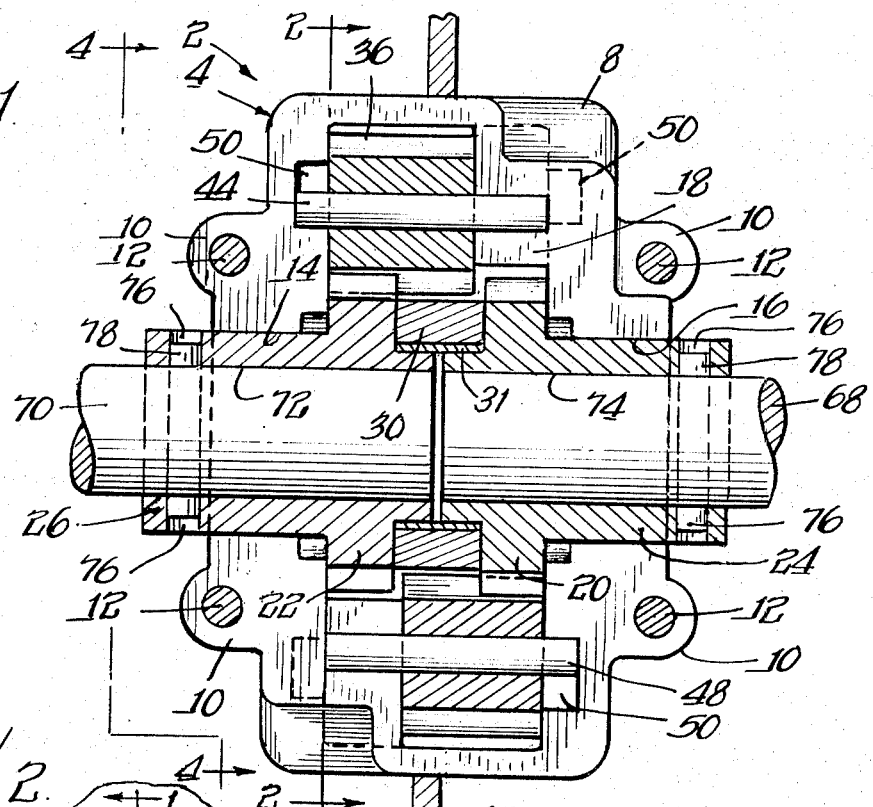
FIG. 1 is a sectional view taken along line 1—1 of FIG. 2 and showing a differential unit constructed in accordance with and embodying the present invention.

Referring now in more detail to the drawing, which illustrates a preferred embodiment of the present invention, 2 designates a differential comprising a housing 4 that is formed of a pair of similar hollow die cast members 6, 8 having peripheral bosses 10. The corresponding bosses 10 of the respective housing members 6, 8 are in abutting relationship and receive bolt and nut assemblies 12 by which the housing members 6,8 are secured together. Formed in the housing members 6,8 centrally of each are bores 14, 16 which, when the housing members are assembled, are coaxial. The bores 14, 16 communicate with the interior or chamber 18 of the housing 4.

Rotatably mounted within the housing chamber 18 centrally thereof are coaxial sun gears 20, 22 which integrally include tubular hub portions 24, 26 that are journalled in the bores 14, 16 and are of such lengths that they project outwardly beyond opposite sides of the housing. Formed in the housing members 6, 8 and surrounding the respective hub portions 24, 26 are annular grooves 28 for receiving a substantial charge of lubricant. Each housing member 6, 8 also integrally includes generally semicircular central sections 30, 32 which together constitute a spacer to maintain the sun gears 20, 22 a small distance axially apart. Within the sections 30 and 32, an annular liner 31 is provided. The liner 31 functions as a bearing about the inner ends of the sun gears 20 and 22.

The peripheral portions of the chamber 18 are of similar, generally oval-shaped configuration and are each sized for receiving planetary gearing. In the form of the invention herein shown, the planetary gearing includes two pairs of meshing pinions, namely a first pair 34, 36 and a second pair 38, 40. The pinions 34, 36 mesh over a portion of their respective tooth widths and the same is true of the pinions 38, 40. The pinions 36, 40 are 180° apart and each mesh with the sun gear 22 and are capable of movement in an orbit thereabout. Similarly, the pinions 34, 36 are 180° apart and each mesh with the sun gear 20 and are capable of movement in an orbit thereabout. Consequently, when torque is applied to the housing 4 the meshing pinion pair 34, 36 and the like meshing pinion pair 38, 40 apply driving torque to rotate the respective sun gears 20, 22. If one of the sun gears, for example sun gear 22, is externally strained against rotation, the other sun gear 20 will still be driven by the rotating housing. However, the planetary gearing formed by the pinions 36, 40, namely the pinions that mesh with the restrained gear, will simply orbit about the restrained gear. Thus, the gearing arrangement provides differential driving for the two sun gears 20, 22.

Figure 2:
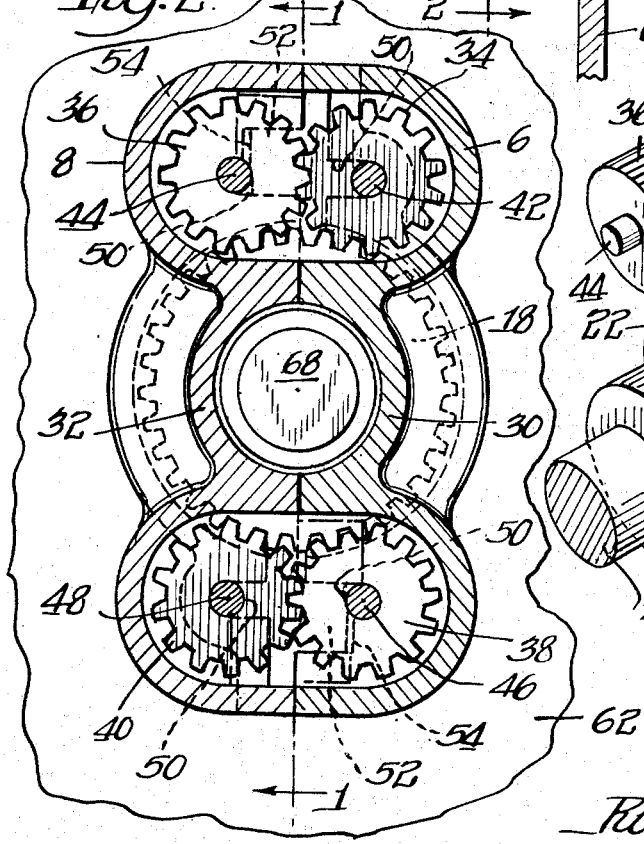
FIG. 2 is a sectional view taken along line 2—2 of FIG. 1.
Figure 3:
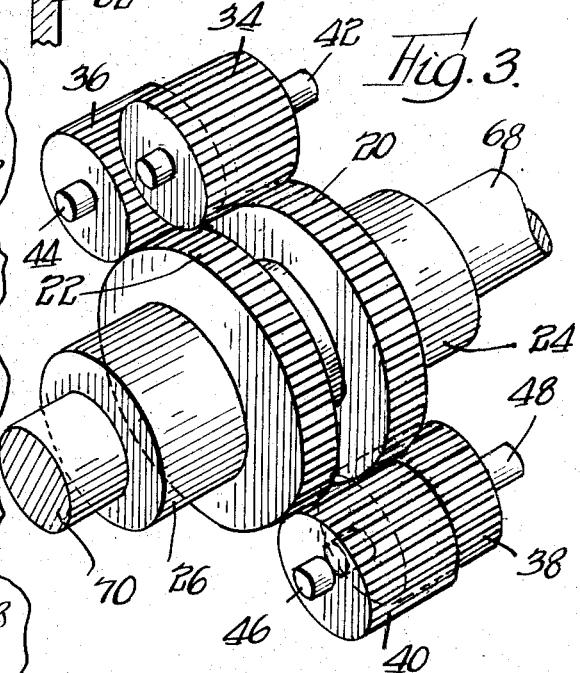
FIG. 3 is a fragmentary perspective view, somewhat diagrammatic in form, and showing the gearing within the differential unit.

The pinions 34, 36 are rotatable on parallel pinion shafts 42, 44, and similarly the pinions 38, 40 are rotatable on parallel pinion shafts 46, 48. Formed in the respective housing members 6, 8 are grooves 50 that open toward the opposite housing member. There is a groove for receiving an end of each of the shafts 42, 44, 46, 48. As seen in FIG. 1, such shaft end is the shorter end as is noted with respect to the shafts 44, 48, and the pinion shafts are furthermore retained against significant axial movement by abutment against interior surfaces of the housing members. As seen in FIG. 2, the housing members 6, 8 meet along a parting region that includes not only the plane passing through the axis of rotation of the sun gears 20, 22, but also at tongues or projections 52. These projections 52 extend from one of the housing members into recesses 54 in the other housing member so as to engage and retain the shorter end of each pinion shaft in place in its associated groove 50 when the housing members are bolted together. Since the adjacent planetary pinions are in mesh over a substantial portion of their tooth width and the pinions mesh with the sun gears, as aforesaid, the arrangement keeps the pinion shafts parallel. Generally speaking the pinion shafts are held reasonably rigid; however, to the extent that the shafts rotatably creep or to the extent that the friction between each pinion shaft departs from an antifriction bearing, the differential will have a limited slip characteristic.

Integrally formed on the peripheries of the housing members 6, 8 opposite to the parting region of the members when the two are assembled, are flanges 56, 58 for receiving bolt and nut assemblies 60. The bolts of the bolt and nut assemblies 60 are adapted to pass through a sprocket 62 which has a central opening 64 that is sized and shaped for receiving the housing 4. Accordingly, the sprocket 62 has a central opening that is somewhat rectangularly shaped but with rounded corners. A drive chain 66 is trained around the drive sprocket 62 to rotate the housing 4, the drive chain 66 receiving its power from the engine of the tractor or other vehicle with which the differential unit is used.

The differential unit 2 is adapted to drive coaxial shafts such as vehicle axles 68, 70 which are adapted to telescope within the bores 72, 74 of the hub portions 24, 26. Outside of the housing 4 the hub portions 24, 26 have holes 76 for receiving roll pins 78, the roll pins passing through diametral holes in the axles 68, 70, whereby the axles 68, 70 are rigidly secured respectively to the hub portions 24, 26. The differential unit 2 is manufactured with the holes 76 already formed so that in order to couple the axles 68, 70 to the respective hub portions 24, 26 it is merely necessary to drill the diametral holes in the axles 68, 70, then insert the axles within the hub portions, and then mount the roll pins 78 in place. A complete or even a partial disassembly of the differential unit is not necessary, thus rendering the unit readily connectable to the axles 68, 70.

The invention is claimed as follows:

1. A differential comprising a housing, a first sun gear in said housing and being rotatable relative thereto, a second sun gear in said housing and being rotatable relative thereto, said sun gears being coaxial, said housing comprising two hollow members secured together and meeting along a parting region, said region including therein a plane in which the axis of rotation of said sun gears is located, first planetary gear means within said housing and mounted on a first shaft, said first planetary gear means meshing with said first sun gear and movable in an orbit thereabout, second planetary gear means within housing and mounted on a second shaft, said hollow members having grooves for receiving said shafts and projections for engaging one end of each shaft in its associated groove, said second planetary gear means meshing with said second sun gear and movable in an orbit thereabout, said planetary gears meshing and each being carried by the housing upon rotation thereof to apply driving torque to said sun gears and permit differential rotation of said sun gears with the projections and mesh of said pinions cooperating to maintain said shafts in substantially parallel relationship within said housing, each of said sun gears having a hub portion projecting outwardly from the housing for coupling to coaxial shafts to be driven by rotation of the housing, and a sprocket having a central opening, said hollow members projecting through said central opening and extending substantial distances on opposite sides of the sprocket and with the peripheral part of the housing engaging the sprocket at said central opening whereby the sprocket serves to hold the members assembled, said parting region plane being perpendicular to the plane of the sprocket, and means for securing said sprocket to said housing.

* * * * *